(No Model.)
G. GARTON.
TOOL FOR FINISHING GLASS BOTTLES.
No. 413,656. Patented Oct. 29, 1889.
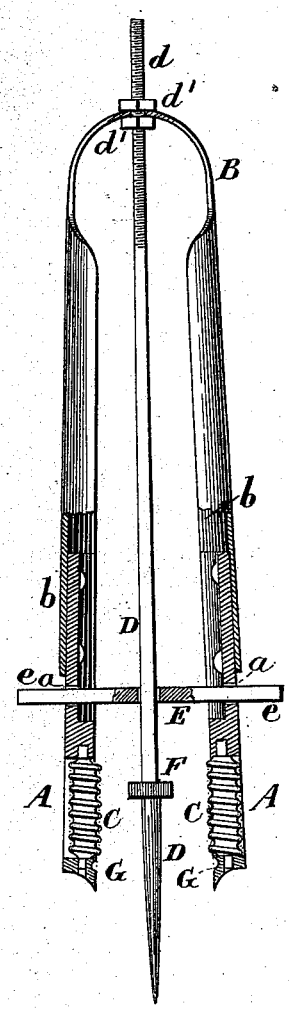
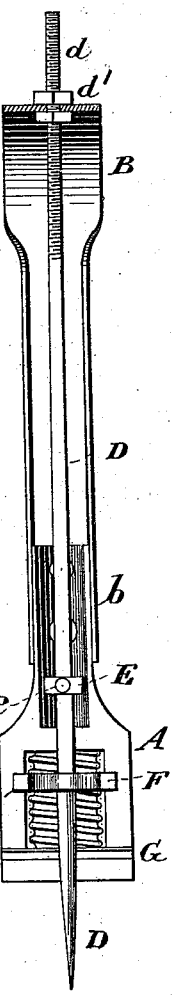
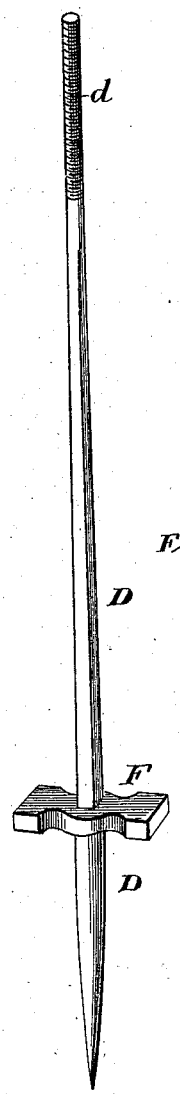
Witnesses.
A. Ruppert.
H. A. Daniels.
Inventor:
George Garton
Per
Thomas P. Simpson
Atty

UNITED STATES PATENT OFFICE.

GEORGE GARTON, OF MILLVILLE, NEW JERSEY.

TOOL FOR FINISHING GLASS BOTTLES.

SPECIFICATION forming part of Letters Patent No. 413,656, dated October 29, 1889.

Application filed July 5, 1889. Serial No. 316,533. (No model.)

*To all whom it may concern:*

Be it known that I, GEORGE GARTON, a citizen of the United States, residing at Millville, in the county of Cumberland and State of New Jersey, have invented certain new and useful Improvements in Tools for Finishing Glass Bottles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to tools for finishing the tops of glass bottles and jars; and it consists in the improvements hereinafter described.

Figure 1 of the drawings is an elevation, partly in section, of my bottle-finishing tool; Fig. 2, a vertical section; and Fig. 3, a detail view of the plug, stem, and smoothing-plate.

In the drawings, A A represent two similar and opposite jaws attached to the legs $b\ b$ of a V-spring B, and in each of these jaws I arrange one or more vertical rollers C, provided with suitable threads, by which a thread may be formed on the outside of the neck of a bottle while in a plastic state and in a heated condition. Between the jaws I arrange the plug D, which enters the mouth of the glass bottle and forms the center about which it is turned. This plug is vertically adjustable by means of its end-threaded stem $d$ and nuts $d'\ d'$.

E is a guide-rod having in the middle a hole $e$, through which the plug-stem $d$ passes, and arms $e'\ e'$, on which are adjustable the jaws A A by means of the holes $a\ a$. The bottle is turned with its neck between the jaws A A until the neck is threaded and cooled.

F is a plate on the plug-stem, and of course adjustable with it, for the purpose of smoothing the top of the bottle-neck, while G G are opposite grooves on the jaws, for the purpose of making a ring or shoulder at the bottom of the threads. Thus it will be seen that at one operation I thread the neck, smooth its top, and make a ring below the thread.

What I claim as new, and desire to protect by Letters Patent, is—

The jaws A A, having opposite grooves $a\ a$ and a pair of threading-rolls in each, combined with a centering-plug D, carrying the top-smoother F, all constructed and arranged substantially as shown, and for the purposes specified.

In testimony whereof I affix my signature in presence of two witnesses.

GEORGE GARTON.

Witnesses:
 ORION H. VANAMAN,
 SAMUEL M. SHELDON.